Patented July 10, 1923.

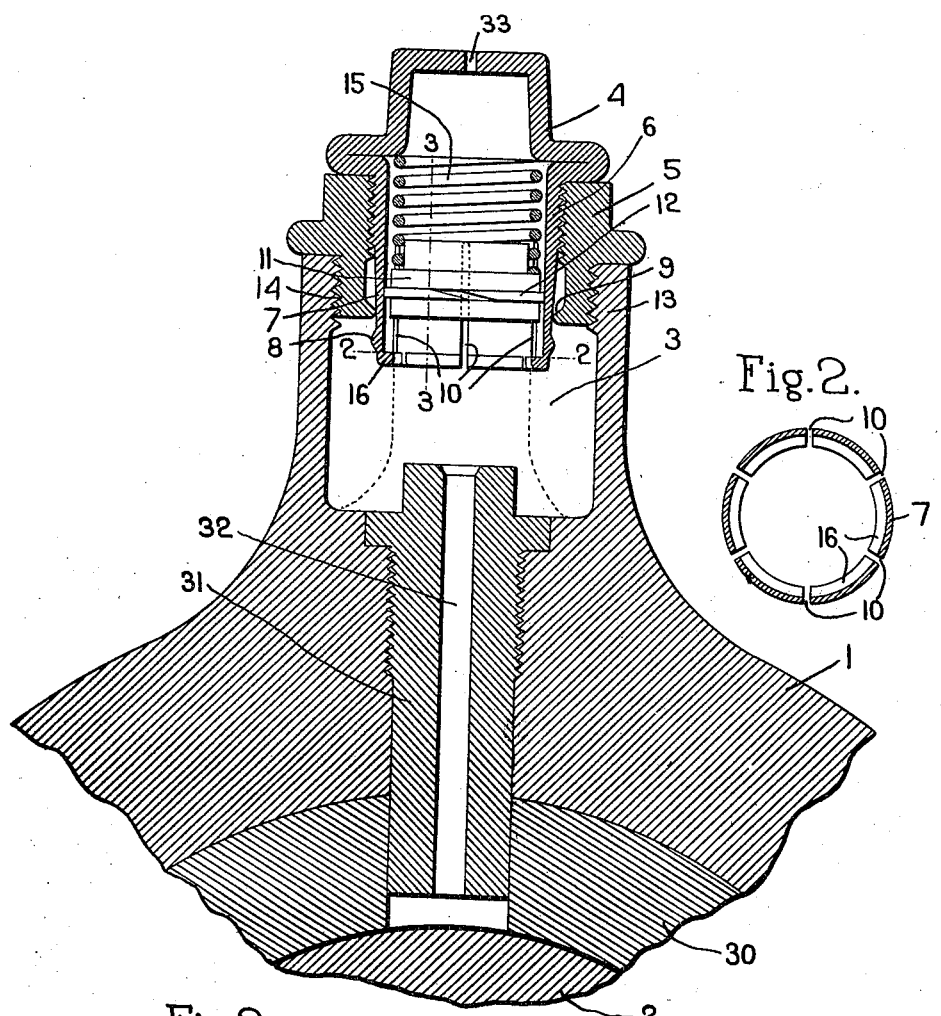

1,461,383

UNITED STATES PATENT OFFICE.

WILLIAM H. DURANT, OF SOMERVILLE, MASSACHUSETTS.

CAP FOR GREASE CUPS.

Application filed October 3, 1921. Serial No. 504,838.

*To all whom it may concern:*

Be it known that I, WILLIAM H. DURANT, a citizen of the United States, and resident of Somerville, county of Middlesex, State of Massachusetts, have invented an Improvement in Caps for Grease Cups, of which the following description, in connection with the accompanying drawing, is a specification, like characters on the drawing representing like parts.

This invention relates to grease cups and particularly to the cap therefor and has for its object to provide a novel grease cup and cap which is constructed so that the cap will be locked in place and will be prevented from becoming lost. A further object of the invention is to provide a grease cup having novel means for automatically feeding the grease to the bearing.

In order to give an understanding of the invention I have illustrated in the drawings a selected embodiment thereof which will now be described after which the novel features will be pointed out in the appended claims.

Fig. 1 is a sectional view through a grease cup embodying my invention.

Fig. 2 is a section on the line 2—2, Fig. 1.

Fig. 3 is a section on the line 3—3, Fig. 1.

While the invention is capable of use generally in connection with grease cups of different construction yet it is specially useful in grease cups that are carried by moving parts where the motion of the part is apt to loosen the cap of the grease cup.

In the drawings I have shown at 1 a part or member in which is journaled a shaft, a portion of which is shown at 2. This member 1 is provided with a bushing 30 in which the shaft rotates. This part 1 is provided with a grease-receiving cavity 3 which is intended to be filled with lubrication for lubricating the part 2, said cavity being closed by a suitable cap 4. The bushing 30 is held in place by a pin 31 which screw threads into the part 1 and enters an aperture in the bushing and said pin is formed with a duct 32 through which the lubrication is conveyed from the cavity 3 to the shaft 2.

The cap 4 is screw-threaded to the part 1 and in the illustrated embodiment of the invention said cap is screwed into a bushing 5 which in turn is screwed into the curb or wall 13 surrounding the cavity 3.

One feature of my invention relates to a construction which will prevent the cap 4 from becoming entirely unscrewed from the part 5, thus retaining the cap in place. This is accomplished by extending the screw-threaded part 6 of the cap to form an apron or extension 7 which extends into the cavity 3. This extension 7 is provided on its exterior with a bead 8 and the part into which the cap screws is provided with an interior bead or rib 9 which is situated beyond the screw threads. The two beads 8 and 9 are so situated relative to each other and the screw threads that while the cap is being screwed into the bushing 5 and before the cap has been screwed entirely into the position shown in Fig. 1 the bead 8 will pass the bead 9. The exterior diameter of the bead 8 is normally larger than the interior diameter of the bead 9 and in order to permit the beads to pass each other one of them is made expansible and contractible radially. In the construction shown in Fig. 1 the bead 8 is thus made and this is provided for by making the apron 7 capable of expanding and contracting radially. Because of the expansible and contractible character of the apron 7 it is possible to screw the cap into place and when this is done the bead 8 is forced over the bead 9 and into the position shown in Fig. 1. As soon as the bead 8 passes the bead 9 the resilient qualities of the apron 7 restores it to the shape shown in Fig. 1 in which the bead 8 has a larger diameter than that of the bead 9.

The force required to carry the bead 8 past the bead 9 is such as can be easily secured by turning the cap 4 with a wrench, but it is sufficient to prevent the cap from unscrewing by the motion or vibration of the parts.

The apron 7 may be given its expansible character in various ways. One simple way is to provide said apron with slits 10 which extend from the end thereof to about the screw-threaded part.

The presence of the apron has a further advantage that it assists in guiding the cap while it is being screwed into the part 5. If the cap is provided with a relatively short screw-threaded portion there is danger that the workman will cross the threads while he is screwing the cap in place but with the extension 7 this cannot happen because said extension holds the cap in proper alignment while the screw threads are started.

I have also illustrated herein means for applying pressure to the grease in the chamber 3 thereby to force it toward the shaft. This means comprises a plunger 11 situated within the extension 7 of the cap and backed by a spring 12 which tends to force it outwardly. The plunger 11 is in the form of a disk encircled by an expansible ring 12 which functions similar to a piston ring. The disk 11 is sufficiently smaller than the interior diameter of the extension 7 to permit said extension to contract as much as is necessary to allow the bead 8 to pass the bead 9. The split ring 12 can also expand and contract and it operates to make a tight fit with the walls of the extension 7 when the latter is expanded and also to permit the extension to contract as much as necessary. Under some circumstances the grease which is used in grease cups of this nature is hard grease and where hard grease is used the spring-pressed plunger 11 applies sufficient pressure to the grease to keep it in firm contact with the rotating part 2.

The bead 9 will preferably be made on the part into which the cap 4 is screw-threaded, whether said part is the bearing 1 or a separate collar screwed into the bearing as shown in the drawings. The construction herein illustrated is one which may be employed when it is desired to change over a grease cup of the old type into one embodying my invention. In this case the collar 5 may be made with the bead 9 and said collar screwed into the boss 13, said collar engaging the screw threads 14 of the boss. In this construction the cap 4 is then screwed into the collar 5 as usual, the latter being provided with the bead 9.

The extension 7 of the cap is provided at its inner end with an in-turned lip 16 which constitutes a stop to limit the spring-pressed movement of the follower or disk and prevents said disk from being ejected from the cap when the latter is removed from the part 1.

While the term "grease" is used in the claims this term, in the broader aspects of the invention, is not to be taken as restrictive of the character or degree of fluidity of the lubricant which may be employed. If, for example, the lubricant be in the form of oil the pressure applying means within the cap become unnecessary and may be removed, the cavity 3 be filled with curled hair or waste to keep out dust and dirt, and oil supplied through the hole 33 in the cap.

I claim:

1. In a grease cup, the combination with a member having a grease-receiving chamber and a screw-threaded opening leading thereto and also an interior bead or rib beyond the screw thread, of a cap screw-threaded into said opening and having means to limit its inward screw-threaded movement, said cap having at its inner end an extension provided with an exterior bead, one of said beads being made expansible and contractible radially and said beads having such a position relative to each other and to the screw threads that they come into engagement and are forced past each other while the screw threads of the cap are in screw-threaded engagement with said member and just before the cap reaches the inward limit of its screw-threaded movement.

2. In a grease cup, the combination with a member having a grease-receiving chamber and a screw-threaded opening leading thereto and also having an interior bead or rib beyond the screw thread, of a cap screw-threaded into said opening, said cap having at its inner end an extension which is expansible and contractible radially and which has a bead on the exterior thereof that normally has a larger exterior diameter than the interior diameter of the first-named bead, said beads being so positioned relative to each other and to the screw thread that they pass each other while the screw threads of the cap are in engagement with those of said member but just before the cap reaches the extreme limit of its inward movement.

3. In a grease cup, the combination with a member having a grease-receiving chamber, and a screw-threaded opening leading thereto and also having an interior bead beyond the screw thread, of a cap screw-threaded into said opening and having at its inner end an extension which is expansible and contractible radially and is provided with an exterior bead which is situated so that it passes the interior bead when the cap is screwed into place or removed, and a spring-pressed follower within said cap, the latter having at its inner end means to limit the spring-pressed movement of the follower.

4. In a grease cup, the combination with a member having a grease-receiving chamber, and a screw-threaded opening leading thereto and also having an interior bead beyond the screw thread, of a cap screw-threaded into said opening and having at its inner end an extension which is expansible and contractible radially and is provided with an exterior bead which is situated so that it passes the interior bead when the cap is screwed into place or removed, and a spring-pressed follower within said cap, said follower being expansible radially.

In testimony whereof, I have signed my name to this specification.

WILLIAM H. DURANT.